No. 783,394.

Patented February 21, 1905.

UNITED STATES PATENT OFFICE.

ALBERT ANGELL, OF ORANGE, NEW JERSEY.

PROCESS OF MANUFACTURING TOBACCO-PIPES.

SPECIFICATION forming part of Letters Patent No. 783,394, dated February 21, 1905.

Application filed February 25, 1904. Serial No. 195,310.

*To all whom it may concern:*

Be it known that I, ALBERT ANGELL, a citizen of the United States, residing in the city of Orange, county of Essex, State of New Jersey, have invented certain new and useful Improvements in Processes for the Manufacture of Tobacco-Pipes from Asbestos, of which the following is a specification.

The improved process herein described is intended to be a substitute for the ordinary tobacco-pipe, and has for its object its indestructible qualities and its cheapness.

The improved process of making the bowls and stems of tobacco-pipes out of asbestos either by rolling together the asbestos paper or thin strips of asbestos, forming a tube of the right thickness and dimensions for the bowl of the pipe, hollow at both ends, one end to be filled in by strips of asbestos so cut and fitted as to fill the opening. The stem to be prepared in same manner and fitted with mouthpiece, as required. The strips of asbestos forming these tubes are coated with a paste composed of condensed milk, either alone or mixed with plaster-of-paris in proportion of one part plaster-of-paris to two of milk, having all or a portion of the original substance of the milk left in it or with any other paste having similar properties. When the pipe is put together in desired shape, it is subjected to a baking process in a very hot oven until all the odor of the paste is burned out, leaving the pipe hard, light, and a dark color, with a roughened surface imitating the bark of wood. Any color, from light brown to dark ebony, can be obtained, greater heat in baking making the darker colors.

I do not confine myself to this method of making asbestos tobacco-pipes; but they can be made by powdering asbestos and making a paste compound of asbestos and condensed milk and forming same by molding and hardened by baking or roasting over a flame.

The use of condensed milk in the manufacture of asbestos pipes has been found very satisfactory as a glue to hold asbestos together and as a coloring agent for exterior of pipe.

I claim as my invention—

1. The improvement in the art of making asbestos pipes which consists in coating the asbestos with condensed milk and subjecting the same to intense heat.

2. The improvement in the art of making tobacco-pipes which consists in coating strips of asbestos with condensed milk and forming a tube, then subjecting the tube to intense heat.

3. The improvement in the art of making tubes for the bowls and stems of tobacco-pipes, which consists in coating asbestos with condensed milk and cutting the asbestos into strips and rolling the strips into tubes and baking the tubes to harden and color said tubes.

ALBERT ANGELL.

Witnesses:
JAMES R. STEWART, Jr.,
SIMEON H. ROLLINSON.